Figure 2:
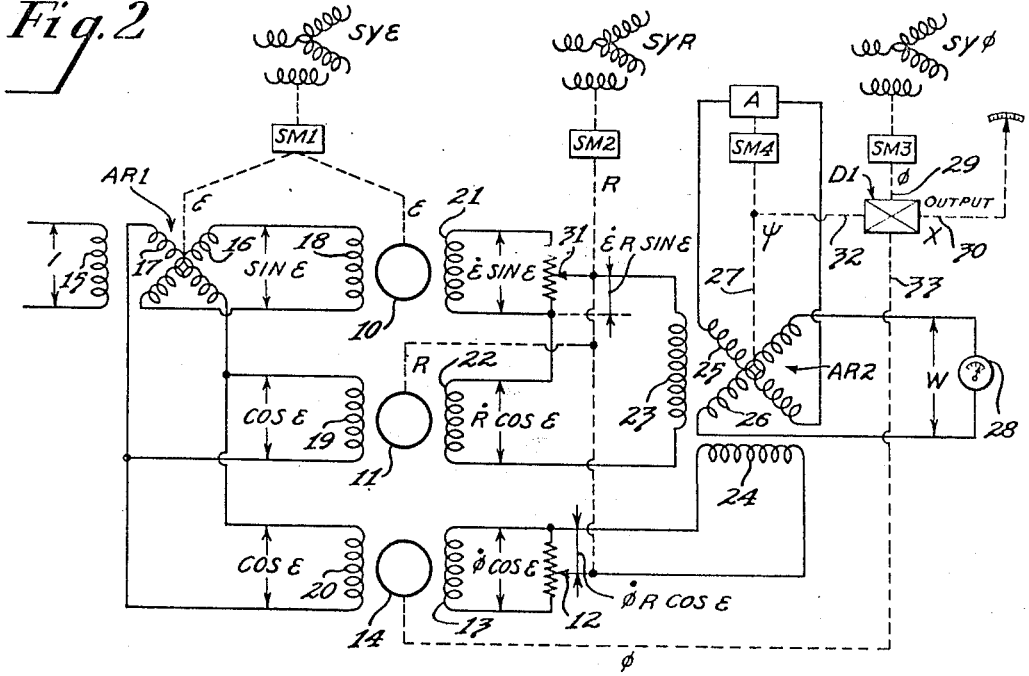

Aug. 15, 1950     W. K. ERGEN     2,519,180
WIND DATA COMPUTER
Filed June 14, 1947

INVENTOR.
William K. Ergen
BY
ATTORNEY.

Patented Aug. 15, 1950

2,519,180

UNITED STATES PATENT OFFICE 2,519,180

WIND DATA COMPUTER

William K. Ergen, Moorestown, N. J., assignor to Radio Corporation of America, a corporation of Delaware Application June 14, 1947, Serial No. 754,737

4 Claims. (Cl. 235—61)

This invention relates to computing devices such as are adapted to provide data on the speed and direction of the wind in response to electrical potentials which are representative of the slant range, elevation and azimuth of a meteorological balloon or like object which moves freely with the wind.

A wind data computer of the prior art is very sensitive to imperfections in the component parts. This is due to the fact that the wind data appear as small differences between large quantities and errors, forming a small percentage of these large quantities, are a seriously large percentage of the wind data.

The computer of the present invention is based on a solution which operates directly with the differential quantities. Errors and imperfections in the equipment will then show up as output errors of the same order of magnitude, and not of a greater order of magnitude.

The principal object of the invention is to provide an improved computing device having a relatively rugged and simple construction. Another object of the invention is the provision of a computing device so constructed that the accuracy of its component parts may be less than that heretofore required. A further object is the provision of an improved wind data computer which (1) is responsive to the angular position of certain shafts, these positions being representative of the elevation angle, slant range and azimuth of an object free to move in the wind, and (2) functions to provide potentials or effects by which the direction and speed of the wind may be indicated.

The invention will be better understood from the following description considered in connection with the accompanying drawings and its scope is indicated by the appended claims.

Figure 1:
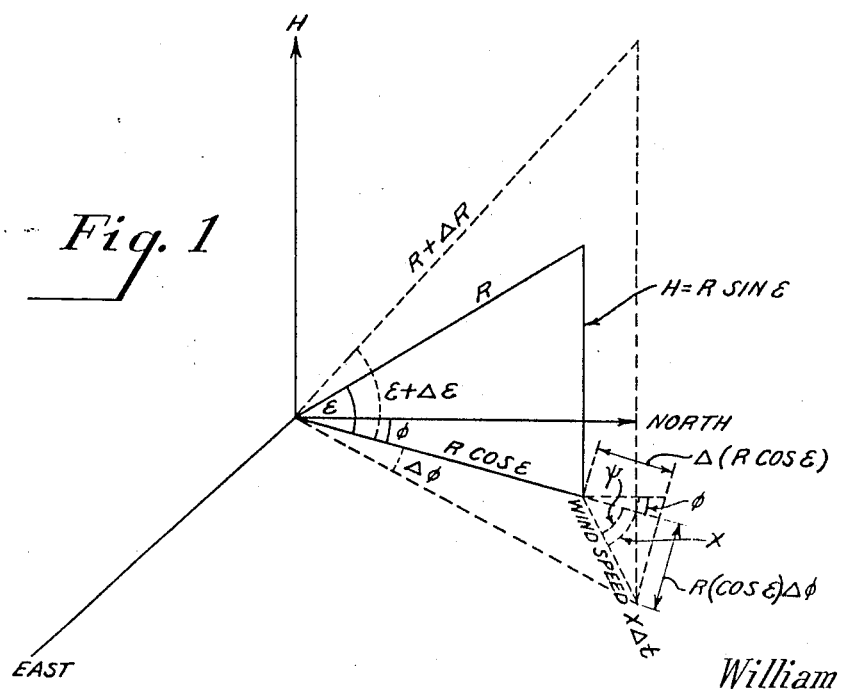

Referring to the drawings:

Fig. 1 is an explanatory diagram depicting the conditions under which the computer operates, and Fig. 2 consists mainly of a wiring diagram of the computer.

The geometry of the problem is illustrated in Fig. 1 wherein $R$ is the slant range,
$\epsilon$ is the elevation angle,
$\phi$ the azimuth of the balloon,
$X$ the wind azimuth,
$\psi = x - \phi$ the angle between wind direction and line of sight to the balloon.

The ground range is $R \cos \epsilon$.

The product of wind speed and time differential $\Delta t$ appears as the hypotenuse of a right triangle, the two legs of which are $$R(\cos \epsilon) \Delta\phi \quad (1)$$

and $$\Delta (R \cos \epsilon) = \Delta R \cos \epsilon - R (\sin \epsilon) \Delta\epsilon \quad (2)$$

The relationship (1) and the left side of Equation 2 can be seen from the drawing, if one considers that the increments are small, so that their products, squares and higher powers can be neglected. For instance $[R \cos \epsilon + \Delta (R \cos \epsilon)] \sin \Delta\phi$ is replaced by $R \cos \epsilon \Delta\phi$, by replacing $\sin \Delta\phi$ by $\Delta\phi$ and neglecting the product $\Delta (R \cos \epsilon) \Delta\phi$. The right side of Equation 2 follows from the left side by the rules of differential calculus, again considering the increments as small.

The angle $\psi$ also appears in this triangle. The wind azimuth is obtained by $$X = \psi + \phi \quad (3)$$

The altitude is given by $$H = R \sin \epsilon \quad (4)$$

The circuit of Fig. 2 includes an elevation synchro SY$\epsilon$, a slant range synchro SYR and a balloon azimuth synchro SY$\phi$. A servomotor SM1 coupled to the synchro SY$\epsilon$ is arranged to drive an angle resolver AR1 and an induction generator 10. A servomotor SM2 coupled to the synchro SYR is arranged to drive an induction generator 11, to control the position of the sliding contact 12 of a potentiometer connected across one of the stator windings 13 of an induction generator 14 and to control the position of the sliding contact 31 of a potentiometer connected across one of the stator windings 21 of the induction generator 10. A servomotor SM3 coupled to the synchro SY$\phi$ is arranged to drive one leg of a differential D—1, as well as an induction generator 14.

Assuming unit voltage to be applied to the stator winding 15 of the angle resolver AR1, a potential representative of $\sin \epsilon$ is produced in its rotor winding 16 and a potential representative of $\cos \epsilon$ is produced in its rotor winding 17. The potential across the winding 16 is applied to the stator winding 18 of the induction generator 10. The potential across the winding 17 is applied to the stator windings 19 and 20 of the induction generators 11 and 14.

The induction generator 10 is essentially a two phase induction motor having one phase (winding 18) excited and having its rotor driven by an external force. The voltage produced on the winding 21 is proportional to the voltage of the winding 18 times the rate of rotation of the rotor.

Under these conditions, there is produced in the stator winding 21 of the induction generator 10 a potential which is representative of the product of the derivative of the elevation angle times the sine of the elevation angle ($\dot{\epsilon} \sin \epsilon$). At the same time, there is produced in the stator winding 22 of the induction generator 11 a potential which is representative of the product of the derivative of the slant range times the cosine of the elevation angle ($\dot{R} \cos \epsilon$). Also produced in the stator winding 13 of the induction motor 14 is a potential representative of the product of the derivative of the azimuth angle times the cosine of the elevation angle ($\dot{\phi} \cos \epsilon$). The voltage between the slider 31 and one end of winding 21 is proportional to $\epsilon R \sin \epsilon$, and the voltage between slider 12 and one end of winding 13 is proportional to $\phi R \cos \epsilon$.

The potentials representative of $\epsilon R \sin \epsilon$ and $\dot{R} \cos \epsilon$ are combined to produce a resultant voltage which is representative of the value of $\dot{R} \cos \epsilon - \epsilon R \sin \epsilon$. This resultant potential is applied to the stator winding 23 of an angle resolver AR2. To another stator winding 24 of this angle resolver is applied the potential representative of $\dot{\phi} R \cos \epsilon$.

The angle resolver AR2 includes two rotor windings 25 and 26 which have their angular position controlled by a servomotor SM4. This motor is energized from an amplifier A having its input terminals connected to the winding 25 of the angle resolver AR2 so that the servomotor always tends to move the rotor windings to a position such that the potential across the winding 25 is zero.

Under these conditions, (1) the motor shaft (indicated by a broken line 27) is positioned in accordance with the angle $\psi$ between the wind and the line of sight to the balloon, and (2) there is produced in the winding 26 a potential representative of the value of the Wind velocity = W =
$$\sqrt{(\dot{R} \cos \epsilon - \epsilon R \sin \epsilon)^2 + (\dot{\phi} R \cos \epsilon)^2}$$

This potential may be indicated on a meter 28 in terms of wind speed or otherwise utilized.

The differential D—1 has shafts 29 and 33 which assume an angular position dependent on the value of the elevation angle $\phi$. It also has a shaft 32 which is driven with the shaft 27 of the angle resolver AR2 and a shaft 30 which assumes a position dependent on the sum of the angles $\psi$ and $\phi$. Since the sum of these two angles is equal to the azimuth of the wind, a pointer attached to the shaft 30 functions to indicate, on a suitable scale, the direction of the wind.

The foregoing facts may be better understood from a more detailed explanation. If two perpendicular stator coils of an angle resolver are supplied with voltages X and Y, respectively, they set up a resultant field proportional to $$\sqrt{X^2 + Y^2}$$

The direction of this field forms an angle with one of the stator coils which is equal to the angle between the hypotenuse and one leg of a right triangle with legs X and Y. In a rotor coil oriented in a perpendicular direction to this resultant field, no voltage will be induced, but if the rotor coil is displaced to one side or the other from this perpendicular direction, a voltage of one phase or other will be induced in the rotor coil. A phase sensitive amplifier-and-servomotor system can thus be used to bring the rotor coil in this perpendicular position, and this position is indicative of the angle between hypotenuse and one leg of the above right triangle.

Another rotor coil, oriented at 90° to the above named rotor coil will then be parallel to the resultant field and in this coil a voltage will be induced which is proportional to the field, that is to $$\sqrt{X^2 + Y^2}$$

This is a standard use of angle resolvers well known to the art. The squaring comes from the theorem of Pythagoras.

Except for a proportionality factor involving the time differential $\Delta t$, the rates ($\dot{R}$, $\dot{\phi}$, $\dot{\epsilon}$ and windspeed) are identical with $\Delta R$, $\Delta \phi$, $\Delta \epsilon$, and windspeed $\times \Delta t$. Hence, it is evident that the voltages fed into the stator coils 23 and 24 correspond to the legs of the right triangle mentioned just prior to the expression (1), supra, and depicted in Fig. 1. According to the above, the amplifier-and-servosystem will orient the rotor coils according to the angle between the hypotenuse and one leg, that is according to $\psi$, and a voltage proportional to the windspeed will be induced in the other rotor coil.

What the invention provides is an improved wind data computed composed of component parts which are relatively rugged and do not have to be constructed with great exactness.

I claim as my invention:

1. In a device for continuously producing a potential representative of the velocity of wind in response to shaft positions which are representative of the slant range, elevation angle and azimuth angle of an object free to move in said wind; the combination of means for converting said elevation angle potential to first and second potentials which are respectively representative of the sine and cosine of said elevation angle; a first generator driven in accordance with said elevation angle and responsive to said first potential for deriving a third potential which is representative of the product of the derivative of said elevation angle times said first potential; a second generator driven in accordance with said slant range and responsive to said second potential for producing a fourth potential which is representative of the product of the derivative of said slant range times said second potential; a third generator driven in accordance with said azimuth angle and responsive to said second potential for producing a fifth potential which is representative of the product of the derivative of said azimuth angle times said second potential; means responsive to said third potential and to the slant range shaft position for producing a sixth potential which is representative of the product of said third potential times the slant range $\epsilon R \sin \epsilon$); means responsive to said fifth potential and to the slant range shaft position for producing a seventh potential which is representative of the product of said fifth potential times the slant range ($R\dot{\phi} \cos \epsilon$); and means responsive to said fourth, sixth and seventh potentials for producing a potential which is representative of the velocity of said wind.

2. In a device for continuously producing a potential representative of the velocity of wind in response to shaft positions which are representative of the slant range, elevation angle and azimuth angle of an object free to move in said wind; the combination of means for converting said elevation angle shaft position to first and second potentials which are respectively representative of the sine and cosine of said elevation angle; a first generator driven in accordance with said elevation angle and responsive to said first potential for deriving a third potential which is representative of the product of the derivative of said elevation angle times said first potential; a second generator driven in accordance with said slant range and responsive to said second potential for producing a fourth potential which is representative of the product of the derivative of said slant range times said second potential; a third generator driven in accordance with said azimuth angle and responsive to said second potential for producing a fifth potential which is representative of the product of the derivative of said azimuth angle times said second potential; means responsive to said third potential and to the slant range shaft position for producing a sixth potential which is representative of the product of said third potential times the slant range ($\epsilon R \sin \epsilon$); means responsive to said fifth potential and to the slant range shaft position for producing a seventh potential which is representative of the product of said fifth potential times the slant range ($R\phi \cos \epsilon$); an angle resolver having one stator winding responsive to the difference between said fourth and sixth potentials, another stator winding responsive to said seventh potential and a pair of rotor windings; and means for deriving from one of said rotor windings a potential which is representative of the speed of said wind.

3. In a device for continuously producing a potential representative of the velocity of wind in response to shaft positions which are representative of the slant range, elevation angle and azimuth angle of an object free to move in said wind; the combination of means for converting said elevation angle shaft position to first and second potentials which are respectively representative of the sine and cosine of said elevation angle; a first generator driven in accordance with said elevation angle and responsive to said first potential for deriving a third potential which is representative of the product of the derivative of said elevation angle times said first potential; a second generator driven in accordance with said slant range and responsive to said second potential for producing a fourth potential which is representative of the product of the derivative of said slant range times said second potential; a third generator driven in accordance with said azimuth angle and responsive to said second potential for producing a fifth potential which is representative of the product of the derivative of said azimuth angle times said second potential; means responsive to said third potential and to the slant range shaft position for producing a sixth potential which is representative of the product of said third potential times the slant range ($\epsilon R \sin \epsilon$); means responsive to said fifth potential and to the slant range shaft position for producing a seventh potential which is representative of the product of said fifth potential times the slant range ($R\phi \cos \epsilon$); an angle resolver having one stator winding responsive to the difference between said fourth and sixth potentials, another stator winding responsive to said seventh potential and a pair of rotor windings; and means for turning said pair of rotor windings to an angular position such that said position is representative of the angle between the direction of said wind and the line of sight to said object and the potential across one of said rotor windings is representative of the speed of said wind.

4. In a device for continuously producing an effect representative of the direction and velocity of wind in response to shaft positions representative of the slant range, elevation angle and azimuth angle of an object free to move in said wind, means to convert said elevation angle and slant range shaft positions into a first potential representative of the product of the differential of the elevation angle, the sine of the elevation angle and the slant range, means to convert said elevation angle and slant range shaft positions into a second potential representative of the product of the differential of the slant range and the cosine of the elevation angle, means to convert said elevation angle slant range and azimuth shaft positions into a third potential representative of the product of the differential of the azimuth angle and the cosine of the elevation angle, an angle resolver having two stator windings disposed to provide fields in quadrature with each other and a rotor having two rotor windings disposed in quadrature with each other within said stator winding fields, means to impress on one of said stator windings the difference between said first and second potentials, means to impress said third potential on the other of said stator windings, means to position said rotor so that one of said rotor windings has no potential induced in it from said stator winding fields whereby the potential induced in the other of said rotor windings is representative of the wind velocity, and means to add the azimuth angle shaft position to the angular position of said rotor to provide a sum angle equal to the wind azimuth.

WILLIAM K. ERGEN.

REFERENCES CITED

The following references are of record in the file of this patent:

UNITED STATES PATENTS

| Number | Name | Date |
| --- | --- | --- |
| 2,115,568 | Becker | Apr. 26, 1938 |
| 2,382,994 | Holden | Aug. 21, 1945 |
| 2,465,624 | Agins | Mar. 29, 1949 |
| 2,467,646 | Agins | Apr. 19, 1949 |